Patented Sept. 10, 1929.

1,727,551

UNITED STATES PATENT OFFICE.

WILLIAM H. LOHMANN, OF WILMINGTON, DELAWARE, ASSIGNOR TO GENERAL CHEMICAL COMPANY, OF NEW YORK, N. Y., A CORPORATION OF NEW YORK.

PROCESS OF MANUFACTURING SODIUM PHOSPHATE.

No Drawing. Application filed May 17, 1927. Serial No. 192,166.

This invention relates to the manufacture of alkali phosphates and more particularly to improvements in the method of producing sodium phosphates by furnacing phosphoric acid and sodium sulfate with carbonaceous material, as, for example, set forth in the U. S. patents to E. H. Strickler, Nos. 744,128 and 1,037,837.

In carrying out the process as heretofore known for preparing trisodium phosphate, solid sodium sulfate such as salt cake of good average quality is added to crude phosphoric acid solution in the proportion of approximately three parts by weight of $Na_2SO_4$ to one part by weight of $P_2O_5$. The mixture is evaporated, coal is added, and the mass furnaced until the reaction is complete and trisodium phosphate is obtained. A similar process has been attempted for the production of disodium phosphate, approximately two parts $Na_2SO_4$ to one part of $P_2O_5$ being used, however, in the mix to be furnaced.

I have discovered by experimentation that the efficiency of the process for the production of sodium phosphate by furnacing sodium sulfate and phosphoric acid may be very materially increased and greatly improved results obtained, however, by controlling the ratio of sodium sulfate to phosphoric acid in the mix to be furnaced within comparatively narrow limits hereinafter specified, irrespective of whether the product to be produced is the di- or trisodium phosphate. More particularly, I have discovered that to provide a highly efficient process for the production of either di- or trisodium phosphate the proportion of sodium sulfate to phosphoric acid in the mix to be furnaced should be regulated to provide a ratio by weight of $Na_2SO_4$ to $P_2O_5$ substantially within the limits of 2.75 to 2.85 of $Na_2SO_4$ to 1 of $P_2O_5$, rather than a ratio of 3 to 1 or 2 to 1 as theoretically required for the production of trisodium phosphate or disodium phosphate respectively. In other terms, the proportion of sodium sulfate should be approximately 92 to 95% of that theoretically required for reaction with the phosphoric acid to produce trisodium phosphate. Thus there will be present a small excess of $P_2O_5$ over that theoretically required for the production of trisodium phosphate.

According to my invention, I prepare a mix by adding sodium sulfate, preferably in the form of salt cake, to phosphoric acid in such proportion that the ratio of $Na_2SO_4$ to $P_2O_5$ is within the limits of 2.75–2.85 to 1, indicated above. This forms a liquor which is first evaporated to dryness. Coal is then added, and the mass furnaced by direct flame until the reaction is complete. It will be found that the resulting product contains about 70% trisodium phosphate, 20 to 25% disodium phosphate, and 5 to 10% miscellaneous compounds such as sodium sulfide, sodium sulfate, sodium carbonate, etc. The reactions in the furnace are somewhat complicated but the indications are that simultaneously sodium sulfate is reduced to sodium sulfide and the orthophosphoric acid to some degree changed into the pyro and meta forms. The phosphoric acid, whatever its form at the time of the formation of the sulfide, is neutralized by it, forming the sodium salts of phosphoric acid or its hydrates. As a result of the operation taking place in the presence of carbonaceous matter, the sodium sulfide left over after the neutralization is partially converted to sodium carbonate. The mixed sodium phosphates fuse with this sodium carbonate and to a large extent are converted to trisodium phosphate.

When there is relatively more sodium sulfate present in the mix to be furnaced than above specified, more sodium sulfide will be formed. This substance is costly to remove by the usual method of precipitating with zinc oxide. Furthermore, the charge in the furnace becomes light and powdery and is easily swept away by the heating gases into the chimney where it is lost. If there is relatively less sodium sulfate present furnacing difficulties are encountered and the charge forms into large balls difficult to break up. Furthermore an increased amount of pyrophosphate is formed. This pyrophosphate leads to the formation of soluble compound metal salts with the several metals present such as iron, aluminum, etc., and these compound salts, upon the subsequent solution of the furnaced product and filtration of the liquor slowly become reconverted to the orthophosphates and are precipitated, thereby contaminating the liquor and subsequent crystallization and causing a direct loss of phosphoric acid. By controlling the ratio by weight of $Na_2SO_4$ to $P_2O_5$ within the limits of 2.75–2.85 to 1, a minimum loss of the elements of the product is incurred, and the furnaced product is obtained in the desired physical state.

In conducting the furnacing operation with the mix prepared according to my invention, I proceed as follows:

The mixture of sodium sulfate and phosphoric acid in the form of a liquor is first evaporated to about 40° Baumé and a charge thereof run into a horizontal rotary furnace. As the furnace rotates, the charge is heated by a direct reducing flame until the liquor dries and the solid mix fuses. The heating is conducted with the reducing flame until the charge commences to foam, this indicating the beginning of the reduction of the sodium sulfate to sulfide. Carbonaceous fuel is then added in small charges until the furnace mix shows only a few per cent of sodium sulfate. When this stage has been reached, the heating flame is made oxidizing by an increased supply of air, and the charge is thereby whitened. This treatment serves to convert a major portion of any sulfide remaining to sulfate and to burn the excess carbonaceous fuel. When the furnace operation is conducted in the manner indicated, a white product having a maximum amount of the desired sodium phosphate product and a minimum amount of impurities such as sodium sulfide, sodium sulfate, or sodium carbonate is obtained.

As specified above, the product contains about 70% trisodium phosphate and about 20–25% disodium phosphate. If trisodium phosphate is to be made, the furnace product is dissolved in water or mother liquor and caustic soda solution is added to convert the disodium phosphate to trisodium phosphate. However, if disodium phosphate is the desired product, phosphoric acid is added to the dissolved furnace product to convert the trisodium phosphate to disodium phosphate.

Obviously, various modifications may be made in the manner of carrying out my invention, for example the mixture of sodium sulfate and phosphoric acid to be furnaced may be prepared by the digestion of phosphate rock with nitre cake and sulfuric acid, the insoluble matter being filtered off prior to furnacing. But the composition of the mix will be carefully controlled before furnacing by the addition of correcting amounts of phosphoric acid or salt cake or the like, if necessary, to maintain the specified proportion of $Na_2SO_4$ to $P_2O_5$ of 2.75–2.85 to 1.

My invention is also applicable to the preparation of other alkali phosphates, in which case the proportion of alkali sulfate will be determined according to the ratio specified above, namely from 92–95% by weight of the amount theoretically required to form a tri-alkali phosphate.

Various other modifications may be made without departing from the spirit of my invention, and I do not wish to limit its scope except as defined in the appended claims.

I claim:

1. The improvement in the process of producing alkali phosphates by furnacing a mixture of an alkali sulfate, phosphoric acid, and carbonaceous material, which consists in regulating the proportions of alkali sulfate and phosphoric acid in the charge to be furnaced to provide substantially 92–95% by weight of the amount of alkali sulfate theoretically required to combine with the phosphoric acid to produce the tri-alkali phosphate.

2. The improvement in the process of producing sodium phosphate by furnacing a mixture of sodium sulfate, phosphoric acid, and carbonaceous material which consists in regulating the proportions of sodium sulfate and phosphoric acid in the charge to be furnaced to provide a ratio by weight of $Na_2SO_4$ to $P_2O_5$ within the limits of substantially 2.75–2.85 to 1.

3. The improvement in the process of producing sodium phosphate which consists in preparing a mixture of sodium sulfate material, phosphoric acid material, and carbonaceous material, furnacing said mixture, and during said furnacing maintaining in the material a small excess of $P_2O_5$ beyond that theoretically required for the production of trisodium phosphate.

4. The process of making alkali phosphates which consists in providing a mixture of phosphoric acid and alkali sulfate, regulating the proportions of alkali sulfate to provide substantially 92–95% by weight of the amount theoretically required to combine with the phosphoric acid to produce tri-alkali phosphate, evaporating the mixture, subjecting the evaporated mixture to the action of a reducing flame until a reduction of the alkali sulfate is commenced, adding carbonaceous material in an amount sufficient to cause reduction of substantially all of the alkali sulfate to sulfide and finally subjecting the mixture to the action of an oxidizing flame.

5. The process of making sodium phosphate which consists in providing a mixture of phosphoric acid and sodium sulfate, regulating the proportion of sodium sulfate to provide a ratio by weight of $Na_2SO_4$ to $P_2O_5$ within the limits of substantially 2.75–2.85 to 1, evaporating the mixture, subjecting the evaporated mixture to the action of a reducing flame until it commences to foam, adding carbonaceous material in an amount sufficient to cause a reduction of substantially all of the sodium sulfate to sulfide while con tinuing to subject the mixture to the action of a reducing flame, and finally subjecting the mixture to the action of an oxidizing flame.

In testimony whereof, I affix my signature.

WILLIAM H. LOHMANN.